Oct. 12, 1926.　　　　　　　　　　　　　　1,602,677
F. H. JORGENSEN
RAT TRAP
Filed Sept. 20, 1923　　2 Sheets-Sheet 1

Witnesses:

F. H. Jorgensen,
Inventor

Oct. 12, 1926.
F. H. JORGENSEN
RAT TRAP
Filed Sept. 20, 1923    2 Sheets-Sheet 2
1,602,677
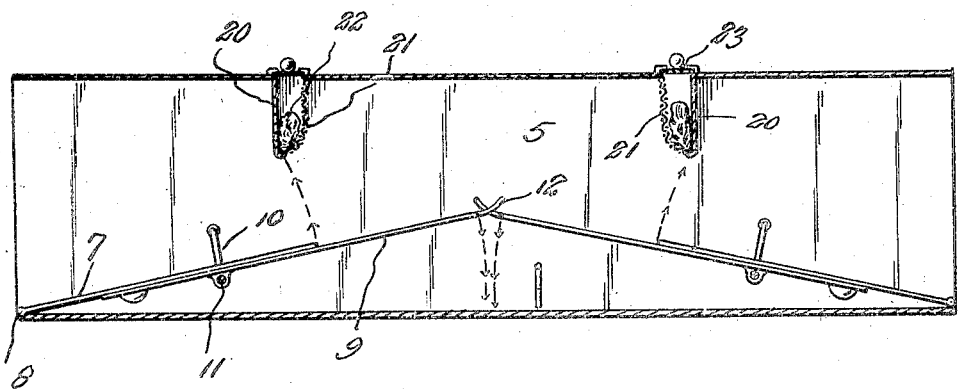
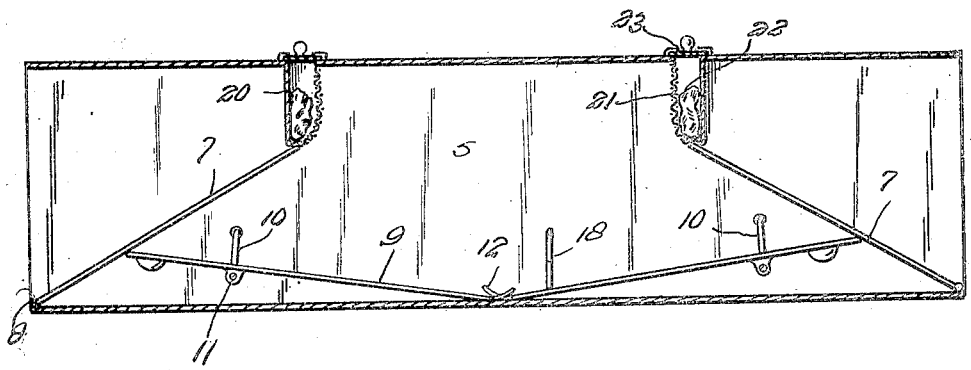
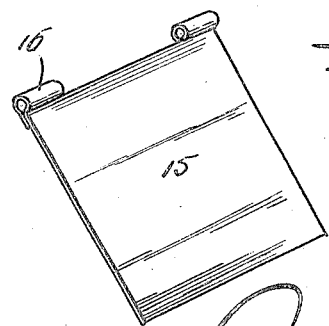
F. H. Jorgensen,
Inventor Patented Oct. 12, 1926.

1,602,677

UNITED STATES PATENT OFFICE.

FRED H. JORGENSEN, OF COUNCIL GROVE, KANSAS.

RAT TRAP.

Application filed September 20, 1923. Serial No. 663,730.

This invention relates to certain new and useful improvements in rat traps, and an object of the invention is to provide a device of this kind which will be extremely reliable in operation.

A further object of the invention is to provide a rat trap which may be cheaply and easily manufactured, and one wherein the operation depends wholly upon the natural action of the rat attempting to gain access to a suitably located bait holder.

Other objects will appear as the nature of the invention is better understood, and the same consists in the novel form, combination, and arrangement of parts, hereinafter more fully described, shown in the accompanying drawings, and claimed.

In the drawings, wherein like reference characters indicate corresponding parts throughout the several views:

Figure 3 is a view, similar to Figure 2, with the parts in trapping position.

Figure 4 is a transverse sectional view, taken substantially upon the line 4—4 of Figure 1, and Figure 5 is a perspective view of the swinging door between the runway housing and the main trap chamber.

Figure 1:
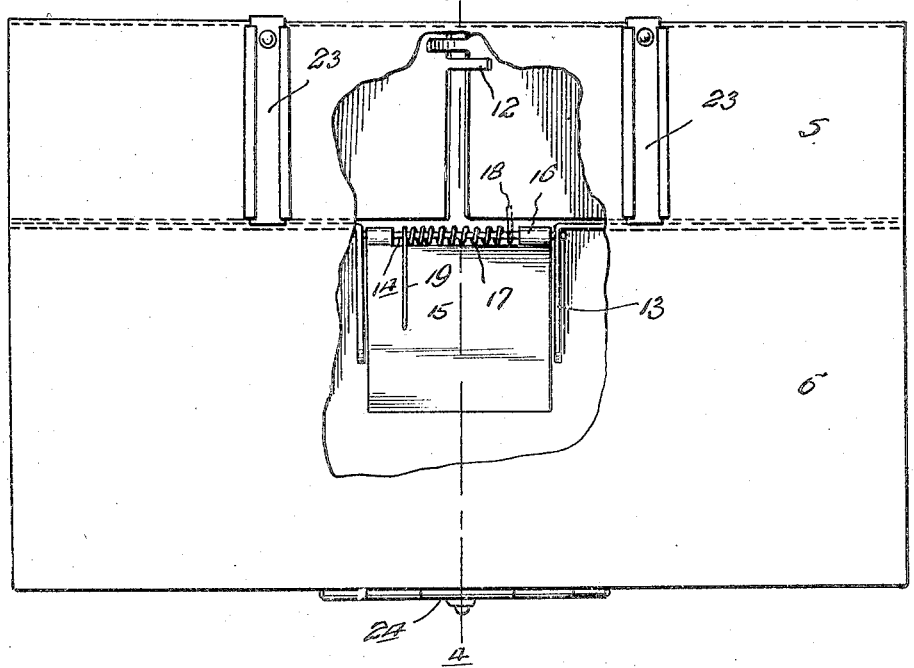
Figure 1 is a top plan view, partly broken away, of a rat trap constructed in accordance with the present invention.
Figure 2:
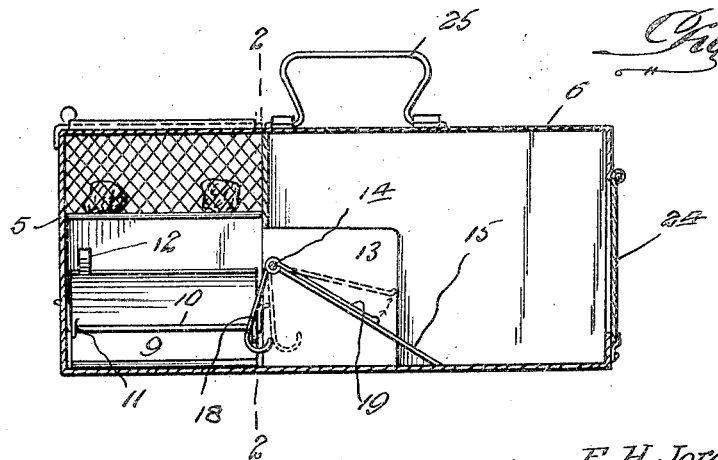
Figure 2 is a longitudinal sectional view, taken substantially upon the line 2—2 of Figure 4, and illustrating the trap in set position.

Referring more in detail to the drawing, the invention embodies a tubular casing 5, alongside of which is positioned a main trap chamber 6, which parts are joined in any suitable manner but being preferable separable. The runway casing 5 is open at both ends and is provided with a pair of inclined runways that extend from the ends of said casing upwardly to a point where they meet at the center of the trap, as shown in Figure 2. Each runway comprises an inclined hinged platform 7 having its outer end pivoted upon a horizontal axis as at 8 for vertical swinging movement, and an inner platform 9 upon which the inner end of the platform 7 overlaps, the platform 9 being carried by a swinging stirrup 10 upon the central portion of which said platform 9 is rigidly mounted as at 11. The adjacent ends of the platforms 9 are provided with projecting tongues 12 which are preferably disposed at one side as shown in Figure 1, and which overlie the opposed platform, whereby, when one platform 9 is depressed, a depression of the other platform 9 is also had.

A doorway is provided between the central portion of the runway casing 5 and the main trap chamber 6, and the latter chamber is provided with a pair of parallel walls 13 that extend transversely of the chamber 6 for a slight distance at opposite sides of said doorway or opening between the casing 5 and chamber 6. The walls 13 support a horizontal pivot pin 14 upon which a normally closed door 15 is hinged for vertical swinging movement, the door 15 being inclined when closed and extending inwardly as shown in Figure 4. The door 15 is preferably formed with end bearing sleeves 16 as shown clearly Figure 5 between which is provided clearance for a helical member 17 which encircles the pivot pin or rod 14 and has one end formed in the chamber of a depending hook shaped arm 18, the other end of said member 17 being extended inwardly to provide an arm as at 19 that overlies and is free of the door 15. The arm 18 is disposed in the path of one of the platforms 9 so as to be swung inwardly upon lowering of said platform whereby the arm 19 is raised and platform 9 passes below the hook arm 18, and then arm 19 drops down and brings the hook over platform 9, holding it down.

Suitably supported in the runway casing at the inner ends of the platform 7 are bait holders 20 that may and preferably do have one side, or the inner side thereof, of perforated or foraminous form as at 21, whereby the scent from the bait 22 disposed in the receptacles will be readily perceived by the animal. The bait holders may be provided with suitable removable covers 23, and the outer side of the main trap chamber is preferably provided with a door 24 through which the trapped rat may be removed, a suitable handle 25 being also provided for removing the trap from place to place. Obviously, the trap may be constructed of any suitable material, and size as conditions may dictate.

In operation, the rat will enter either open end of the casing 5 and pass inwardly on the adjacent platform 7 to gain access to the bait 22 which may be had only by passing on said platform 7 onto the adjacent platform 9. When this takes place, the weight of the animal causes downward swinging movement of said platform 9 at its inner end, and as the outer end of said platform 9 is disposed beneath the before mentioned platform 7, the latter is caused to swing upwardly into engagement with the bottom of the bait holder so as to close the adjacent end of the runway casing as shown in Figure 3. Also, when this work platform 9 is depressed, the finger 12 thereof engages the other platform 9 so as to cause the same to also lower for swinging the other platform 7 upwardly to closed position. The animal is thus securely trapped and lowered away from a pointer near the bait and as the platform 9 has thus been engaged beneath the arm 18, the only escape for the animal is to swing the door 15 upwardly to an open position by pushing against the latter. When this is done, the animal will pass through the doorway closed by said door 15 into the main trap chamber 6, in an endeavor to escape. When the door 15 swings upwardly, the arm 19 is moved to swing the arm 18 to the dotted line position thereof in Figure 4, wherein the arm 18 is released or out of the path of the platform 9. The parts will return to normal position when the rat passes under said door 15, which is relatively light, after which said door 15 will lower to closed position and prevent return of the rat into the runway casing. In passing through the doorway closed by the door 15, the weight of the animal will be relieved from the platforms 9, and the latter as well as the platforms 7 will return, due to gravity to their original set position as shown in Figure 2.

The trap is then ready for trapping another animal.

It is believed that, from the above description, the construction and operation as well as the advantages of the present invention will be readily understood and appreciated by those skilled in the art.

Minor changes may be made without departing from the spirit and scope of the invention as claimed.

What I claim as new is:

In an animal trap of the class described, a casing, trapping means arranged in said casing, said trapping means being animal actuated, said casing being formed in one side with an opening, a trapping chamber disposed alongside of said casing and having an opening communicating with the first named opening and affording a passage in the casing and chamber, there being a pair of spaced walls extending into the chamber from said passage, a downwardly inclined door disposed between and pivotally connected at its upper end to said walls, and trip mechanism for the aforesaid trapping means in the chamber comprising a single length of wire coiled between its ends and surrounding the pivot pin for said door, one end of the wire being suspended downwardly and into the interior of the aforesaid casing, and having its lower end bent to form a release hook for cooperation with said trapping means, the other end of the wire overlying said door to be engaged by the latter when swung upwardly by the animal, whereby to disengage said hook from the trapping means.

In testimony whereof I affix my signature.

FRED H. JORGENSEN